(12) United States Patent
Park et al.

(10) Patent No.: US 11,256,081 B2
(45) Date of Patent: Feb. 22, 2022

(54) BEAM SCANNING DEVICE AND SYSTEM INCLUDING THE SAME COMPRISING A PHASE MASK HAVING A PLURALITY OF NANOSTRUCTURES TO CONTROL THE PHASE OF LIGHT FROM A SPATIAL LIGHT MODULATOR

(71) Applicant: SAMSUNG ELECTRONICS CO., LTD., Suwon-si (KR)

(72) Inventors: Junghyun Park, Seoul (KR); Sunil Kim, Hwaseong-si (KR); Duhyun Lee, Yongin-si (KR); Byunggil Jeong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 307 days.

(21) Appl. No.: 16/416,972

(22) Filed: May 20, 2019

(65) Prior Publication Data

US 2020/0183148 A1 Jun. 11, 2020

(30) Foreign Application Priority Data

Dec. 11, 2018 (KR) .......................... 10-2018-0159116

(51) Int. Cl.
*G02B 26/06* (2006.01)
*G01S 7/481* (2006.01)
(Continued)

(52) U.S. Cl.
CPC ............ *G02B 26/06* (2013.01); *G01S 7/4817* (2013.01); *G02B 26/10* (2013.01); *G01S 17/08* (2013.01);
(Continued)

(58) Field of Classification Search
CPC ........ G01S 7/4817; G01S 17/89; G01S 17/36; G01S 17/86; G01S 17/894; G01S 7/4863;
(Continued)

(56) References Cited

U.S. PATENT DOCUMENTS 8,144,384 B2 3/2012 Fujimori et al.
8,659,037 B2 * 2/2014 Kim ......................... G09G 3/32
257/90

(Continued)

FOREIGN PATENT DOCUMENTS

JP   2019-20715 A    2/2019
KR   10-0239489 B1   1/2000

OTHER PUBLICATIONS

I.M. Vellekoop et al., "Exploiting disorder for perfect focusing", Nature Photonics 4, Oct. 5, 2009, pp. 1-4 (4 pages total).
(Continued)

*Primary Examiner* — Que Tan Le
(74) *Attorney, Agent, or Firm* — Sughrue Mion, PLLC

(57) ABSTRACT

Provided are a beam scanning device and a system including the beam scanning device. The beam scanning device includes: a spatial light modulator configured to modulate a phase of a light for a corresponding pixel of a plurality of pixels; and a phase mask including a support plate arranged in an output direction of the light that is output from the spatial light modulator and a plurality of nanostructures arranged on the support plate differently for each of the plurality of pixels to control the phase of the light.

25 Claims, 22 Drawing Sheets

(51) Int. Cl.
*G02B 26/10* (2006.01)
*G01S 17/08* (2006.01)
*G01S 17/89* (2020.01)

(52) U.S. Cl.
CPC ........ *G01S 17/89* (2013.01); *G02B 2207/101* (2013.01)

(58) Field of Classification Search
CPC . G01S 7/4914; G02B 2207/101; G02B 26/10; G02B 26/06; G02B 26/0816; G02B 6/0013; G02F 1/292; G02F 1/0311; G02F 2201/307; G02F 2201/346; H01L 27/14645; H01L 27/14649; H01L 27/14665
USPC .............................. 250/234, 235, 221, 208.1
See application file for complete search history.

(56) References Cited

U.S. PATENT DOCUMENTS

| 9,103,973 | B2 | 8/2015 | Fattal et al. |
| 10,670,941 | B2 | 6/2020 | Park et al. |
| 2016/0223723 | A1 | 8/2016 | Han et al. |
| 2018/0196137 | A1 | 7/2018 | Lee et al. |
| 2018/0196138 | A1 | 7/2018 | Lee et al. |

OTHER PUBLICATIONS

Communication dated Feb. 4, 2020, issued the European Patent Office in counterpart European Application No. 19185138.5.

Shane Colburn et al. "Tunable metasurfaces via subwavelength phase shifters with uniform amplitude" Scientific Reports, vol. 7, Jan. 5, 2017, (9 pages total).

* cited by examiner

BEAM SCANNING DEVICE AND SYSTEM INCLUDING THE SAME COMPRISING A PHASE MASK HAVING A PLURALITY OF NANOSTRUCTURES TO CONTROL THE PHASE OF LIGHT FROM A SPATIAL LIGHT MODULATOR

CROSS-REFERENCE TO RELATED APPLICATION

This application claims priority to Korean Patent Application No. 10-2018-0159116, filed on Dec. 11, 2018, in the Korean Intellectual Property Office, the disclosure of which is incorporated herein by reference in its entirety.

BACKGROUND

1. Field

Example embodiments of the present disclosure relate to a beam scanning device capable of extending a scanning region of a light beam and a system including the beam scanning device.

2. Description of the Related Art

Advanced Driver Assistance Systems (ADASs) having various functions have been commercialized. For example, there have been an increase of vehicles with Adaptive Cruise Control (ACC) for recognizing the position and speed of another vehicle, reducing the speed of a vehicle when there is a risk of collision with the other vehicle, and driving the vehicle within a set speed range when there is no risk of collision with the other vehicle, or an Autonomous Emergency Braking System (AEB) for recognizing a preceding vehicle and preventing a collision with the preceding vehicle by automatically braking a vehicle when a driver does not respond or responds improperly thereto although there is a risk of collision with the preceding vehicle. Also, autonomous vehicles are expected to be commercialized in the near future.

Accordingly, there is an increasing interest in optical measuring devices capable of providing information around a vehicle. For example, a vehicle Light Detection and Ranging (LiDAR) sensor may radiate a laser to a selected region around a vehicle and detect a reflected laser to provide information about the distance, relative speed, and azimuth with respect to an object around the vehicle. For this, the vehicle LiDAR sensor may include a beam scanning device capable of scanning light in a desired region.

For example, beam scanning devices may be classified into mechanical beam scanning devices and non-mechanical beam scanning devices. For example, the mechanical scanning devices may include a mode of rotating a light source itself, a mode of rotating a mirror that reflects light, and a mode of moving a spherical lens in a direction perpendicular to an optical axis. Also, the non-mechanical scanning devices may include a mode of using a semiconductor device and a mode of electrically controlling the angle of reflected light by using a reflective phased array.

SUMMARY

One or more example embodiments provide a beam scanning device capable of extending a scanning region of a light beam.

One or more example embodiments also provide a system including a beam scanning device capable of extending a scanning region of a light beam.

Additional aspects will be set forth in part in the description which follows and, in part, will be apparent from the description, or may be learned by practice of the presented embodiments.

According to an aspect of an example embodiment, a beam scanning device includes: a spatial light modulator configured to modulate a phase of a light for a corresponding pixel of a plurality of pixels; and a phase mask comprising a support plate arranged in an output direction of the light that is output from the spatial light modulator and a plurality of nanostructures arranged on the support plate differently for each of the plurality of pixels to control the phase of the light.

The spatial light modulator may include a first reflector, a second reflector, and a cavity provided between the first reflector and the second reflector.

Each of the first reflector and the second reflector may include a distributed Bragg reflector or a grating reflector.

The spatial light modulator may be driven independently for each of the plurality of pixels by an input of at least one of voltage, current, heat, and magnetic field.

The support plate may include a transparent plate.

The plurality of nanostructures may include a dielectric having a refractive index of about 1.9 to about 4.

The plurality of nanostructures may include at least one selected from a group consisting of Si, Ge, SiGe, GaAs, $Si_3N_4$, $TiO_2$, GaP, and InSb.

The plurality of nanostructures may have a column shape.

The plurality of nanostructures of the phase mask may have at least one of a cylinder shape, a polygonal column shape, and a cross column shape.

The plurality of nanostructures may be configured differently for each of the plurality of pixels in terms of at least one of a nanostructure size, the number of nanostructures, a nanostructure shape, and an arrangement interval of nanostructures.

When a wavelength of light used in the beam scanning device is λ and a refractive index of a nanostructure is n, an arrangement interval of the plurality of nanostructures may be in a range of $\lambda/2n$ to $5\lambda/2n$.

When a wavelength of the light incident onto the beam scanning device is λ and a refractive index of the plurality of nanostructures is n, a height of the plurality of nanostructures may be in a range of $3\lambda/2n$ to $7\lambda/2n$.

The beam scanning device may further include a spacer provided between the spatial light modulator and the phase mask.

According to an aspect of an example embodiment, a system includes: a light source configured to radiate a light; a beam scanning device configured to scan an object by adjusting a travel direction of a light that is output from the light source, and including a spatial light modulator configured to modulate a phase of the light for a corresponding pixel of a plurality of pixels, and a phase mask comprising a support plate arranged in an output direction of the light that is output from the spatial light modulator and a plurality of nanostructures arranged on the support plate differently for each of the plurality of pixels to control the phase of the light; and a light detector configured to detect the light when the light is reflected from the object.

The spatial light modulator may include a first reflector, a second reflector, and a cavity portion provided between the first reflector and the second reflector.

Each of the first reflector and the second reflector may include a distributed Bragg reflector or a grating reflector.

The spatial light modulator may be driven independently for each of the plurality of pixels by an input of at least one of voltage, current, heat, and magnetic field.

The plurality of nanostructures may include a dielectric having a refractive index of about 1.9 to about 4.

The plurality of nanostructures may include at least one selected from the group consisting of Si, Ge, SiGe, GaAs, $Si_3N_4$, $TiO_2$, GaP, and InSb.

The plurality of nanostructures of the phase mask may include at least one of a cylinder, a polygonal column, and a cross column.

The plurality of nanostructures may be configured differently for each pixel in terms of at least one of a nanostructure size, the number of nanostructures, a nanostructure shape, and an arrangement interval of nanostructures.

When a wavelength of the light is $\lambda$ and a refractive index of a nanostructure is n, an arrangement interval of the plurality of nanostructures is in a range of $\lambda/2n$ to $5\lambda/2n$.

When a wavelength of the light is $\lambda$ and a refractive index of a nanostructure is n, a height of the plurality of nanostructures is in a range of $3\lambda/2n$ to $7\lambda/2n$.

The beam scanning device may further include a spacer between the spatial light modulator and the phase mask.

According to an aspect of an example embodiment, a beam scanning device may include a plurality of pixels, wherein each of the plurality of pixels may include: a spatial light modulator configured to modulate a phase of a light based on a voltage applied to the spatial light modulator; and a phase mask including a plurality of differently-shaped nanostructures configured to deflect the light incident onto the plurality of nanostructures from the spatial light modulator, and wherein the plurality of pixels may have different nanostructure arrays from each other.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
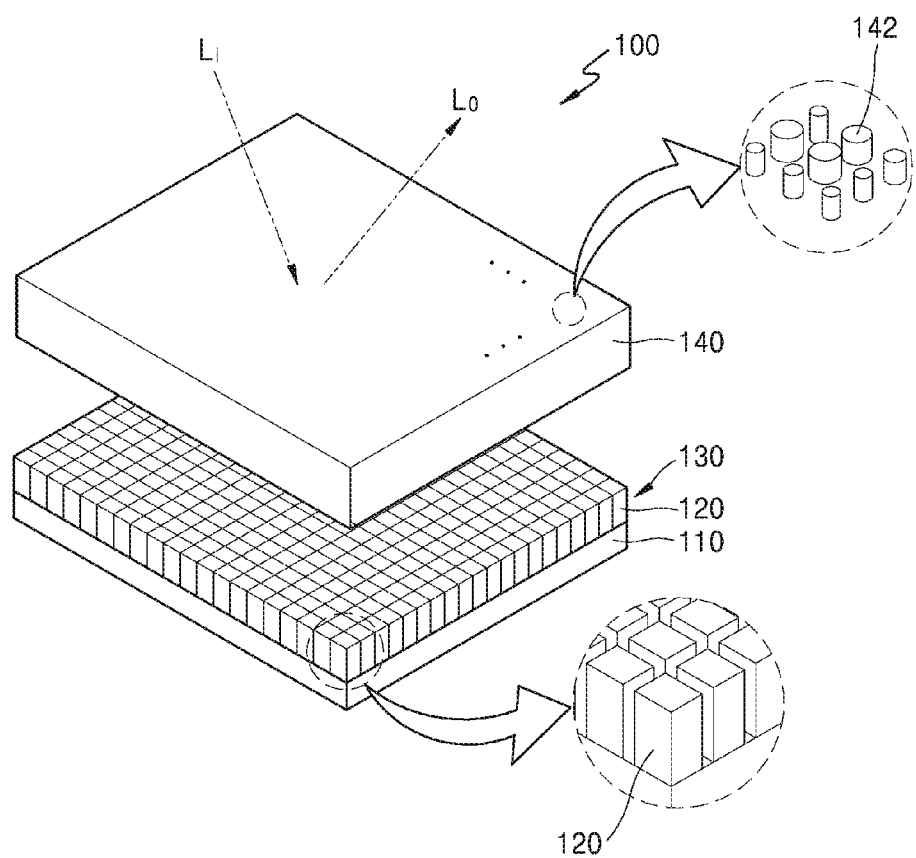
FIG. 1 schematically illustrates a beam scanning device according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinafter, a beam scanning device and a system including the same according to various embodiments will be described in detail with reference to the accompanying drawings. In the drawings, like reference numerals may denote like elements, and the size of each element may be exaggerated for clarity and convenience of description. Although terms such as "first" and "second" may be used herein to describe various elements or components, these elements or components should not be limited by these terms. These terms are only used to distinguish one element or component from another element or component.

As used herein, the singular forms "a", "an", and "the" are intended to include the plural forms as well, unless the context clearly indicates otherwise. Also, when something is referred to as "including" a component, another component may be further included unless specified otherwise. Also, in the drawings, the size or thickness of each element may be exaggerated for clarity of description. Also, when a material layer is referred to as being "on" a substrate or another layer, it may be directly on the substrate or the other layer or one or more intervening layers may be present therebetween. Also, in the following embodiments, since materials forming each layer are merely examples, other materials may also be used.

FIG. 1 schematically illustrates a beam scanning device according to an example embodiment.

A beam scanning device 100 may include a spatial light modulator 130 that may modulate the phase of light and a phase mask 140 through which the light exiting from the spatial light modulator 130 may propagate. The spatial light modulator 130 may be arranged on a substrate 110 in units of pixels 120. The spatial light modulator 130 may modulate the phase of light for each pixel 120. The pixel 120 may be a unit capable of independently driving the spatial light modulator 130. Alternatively, the pixel 120 may be a unit capable of modulating the phase thereof.

For example, the spatial light modulator 130 may be driven independently for each pixel 120 by an input of at least one of voltage, current, heat, and magnetic field. The spatial light modulator 130 may be arranged, for example, in a matrix form. However, the arrangement form is not limited to a matrix form. For example, a voltage Vpq may be applied to the p-th row and q-th column pixel, and the spatial light modulator 130 in each pixel 120 may modulate the phase of light according to the applied voltage. Alternatively, the phase of light may be modulated by adjusting the temperature thereof by applying heat to each pixel 120.

The spatial light modulator 130 may be arranged on the substrate 110 to be spaced apart in units of pixels 120. The beam scanning device 100 may modulate the phase of input light Li to adjust the travel direction of output light Lo that is output from the phase mask 140. The phase mask 140 may include a plurality of nanostructures 142.

Figure 2:
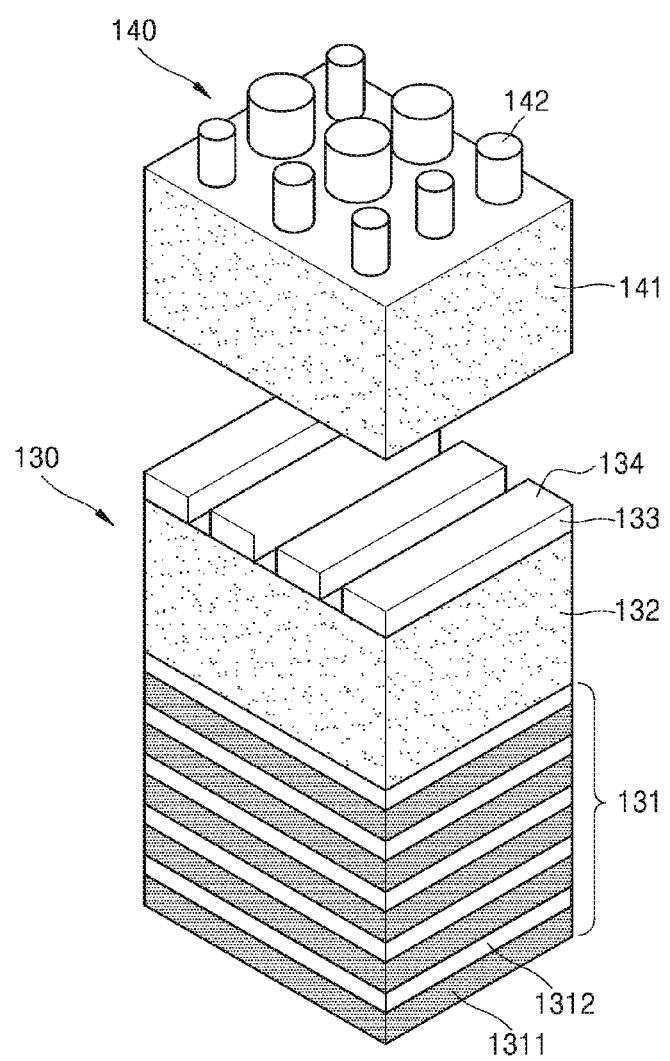
FIG. 2 illustrates an example of a spatial light modulator and a phase mask of a beam scanning device according to an example embodiment.

For convenience of description, FIG. 2 illustrates an enlarged view of one pixel configuration of a beam scanning device 100. The spatial light modulator 130 may include a first reflector 131, a cavity portion 132 for resonance, and a second reflector 133. Light of a particular phase may be output when light is repeatedly reflected between the first reflector 131 and the second reflector 133. The particular phase may be controlled according to an input value such as a voltage, a current, heat, or a magnetic field input to the spatial light modulator 130. The spatial light modulator 130 may change a resonance frequency by influencing the electromagnetic field inside the cavity portion 130. The light that has entered the spatial light modulator 130 may be transmitted through the first reflector 131, propagated through the cavity portion 132, and then reflected by the second reflector 133, and the reflected light may be trapped and resonated in the cavity portion 132 by the first reflector 131 and the second reflector 133 and then output through the first reflector 131. The resonance characteristics thereof may be changed by an external signal applied to the spatial light modulator 130 and thus the phase of the light output outside may be adjusted.

The first reflector 131 may include, for example, a distributed Bragg reflector (DBR) or a grating reflector. FIG. 2 illustrates an example in which the first reflector 131 includes a DBR. The DBR may be configured such that a first layer 1311 and a second layer 1312 having different refractive indexes are alternately stacked a plurality of times. Due to the difference in refractive indexes, all reflected waves at the interface of each layer may interfere with each other.

The second reflector 133 may include, for example, a DBR or a grating reflector. FIG. 2 illustrates an example in which the second reflector 133 includes a grating reflector. The grating reflector may be arranged such that gratings 134 are spaced apart at certain intervals. For example, the intervals, heights, and/or widths of the gratings 134 may be adjusted to control the reflection and transmission of light. The gratings 134 may have a higher refractive index than the surrounding material.

The phase mask 140 may include a support plate 141 and a plurality of nanostructures 142 arranged on the support plate 141. The support plate 141 may include a transparent plate that transmits light.

The nanostructures 142 may include nano-sized structures. The nanostructures 142 may include, for example, column-shaped structures. FIG. 2 illustrates an example in which the nanostructures 142 are cylinders. The phase mask 140 may include a nanostructure array in a region corresponding to the pixel of the spatial light modulator 130. The nanostructures 142 corresponding to the pixel may be disposed directly below or above the pixel, and the nanostructures and the corresponding pixel may be arranged in a direction in which a light propagates. For example, the phase mask 140 may have a different nanostructure array for each pixel to form a disordered-engineered metasurface (DEM). The nanostructures 142 may be configured differently according to pixels in terms of at least one of the nanostructure size, the number of nanostructures, the nanostructure shape, and the arrangement interval of nanostructures. The nanostructures 142 may be arranged periodically or aperiodically. The nanostructures 142 may be arranged on one support plate 141, and the arrangement of the nanostructures 142 may be designed in units of pixels. In other words, the nanostructures 142 may have an arrangement designed in accordance with a particular function for each pixel. The arrangement of the nanostructures 142 may be configured differently for each pixel in terms of, for example, at least one of the nanostructure size, the number of nanostructures, the nanostructure shape, and the arrangement interval of nanostructures.

Figure 3:
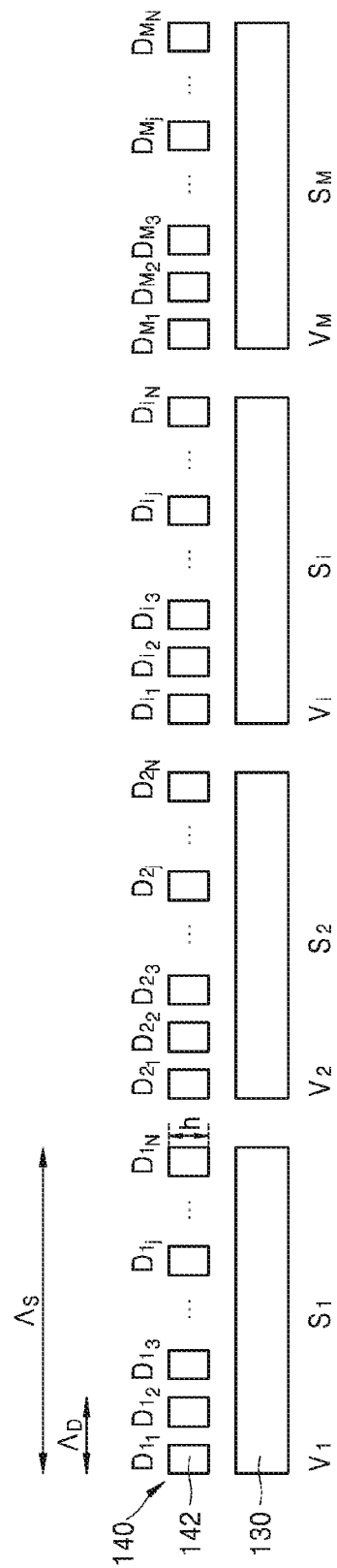
FIG. 3 illustrates a one-dimensional (1D) nanostructure array of a beam scanning device according to an example embodiment.

FIG. 3 illustrates a one-dimensional (1D) nanostructure array in each pixel. When there are a first pixel $S_1$, a second pixel $S_2$, ..., an M-th pixel $S_M$, a first set of a spatial light modulator 130 and a plurality of nanostructures 142 is provided in the first pixel $S_1$, a second set of a spatial light modulator 130 and a plurality of nanostructures 142 is provided in the second pixel $S_2$, and a M-th set of a spatial light modulator 130 and a plurality of nanostructures 142 is provided in the M-th pixel $S_M$. It is assumed that the number of nanostructures 142 in each pixel is N, the interval between adjacent nanostructures is $\Lambda_D$, and the interval between adjacent pixels is $\Lambda_S$. In FIG. 3, the intervals of the nanostructures are constant. Here, $\Lambda_S = N*\Lambda_D$.

The nanostructure 142 may include a low-loss dielectric material with a high refractive index. The nanostructure may include, for example, a dielectric with a refractive index of about 1.9 to about 4.0. The nanostructure may include, for example, at least one selected from the group consisting of Si, Ge, SiGe, GaAs, $Si_3N_4$, $TiO_2$, GaP, and InSb, or any combination thereof.

When the wavelength of light used in a beam scanning device is $\lambda$ and the refractive index of a nanostructure is n, the arrangement interval of nanostructures may be in a range of $\lambda/2n$ to $5\lambda/2n$. Also, when the wavelength of light used in a beam scanning device is $\lambda$ and the refractive index of a nanostructure is n, the arrangement interval of nanostructures may be in a range of $3\lambda/2n$ to $7\lambda/2n$. The change in the transmission characteristics of light depending on the change in the diameter (or size) of the nanostructures 142 will be described below.

Figure 4:
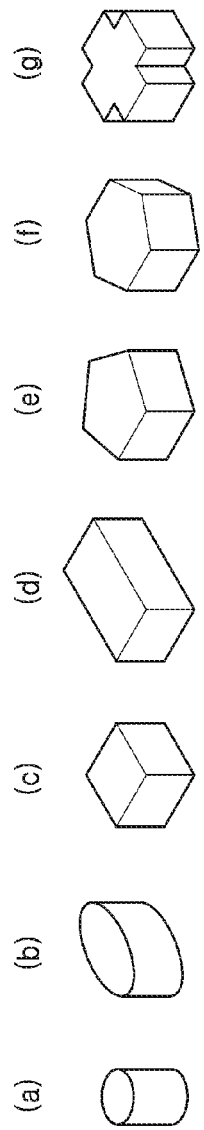
FIG. 4 illustrates various examples of a nanostructure included in a beam scanning device according to an example embodiment.

FIG. 4 illustrates various shapes of nanostructures according to example embodiments of the present disclosure.

The nanostructures may be column-shaped. As shown in FIG. 4, the nanostructures may have, for example, a cylinder shape, such as a circular cylinder shape (a) and/or an elliptical cylinder shape (b). The nanostructures may have a polygonal column shape, such as a cube shape (c), a rectangular column shape (d), a pentagonal column shape (e), a hexagonal column shape (f), and/or a cross column shape (g). The polygonal column may have various other shapes. The shapes of the nanostructures may be arranged in various ways for each pixel.

Figure 5:
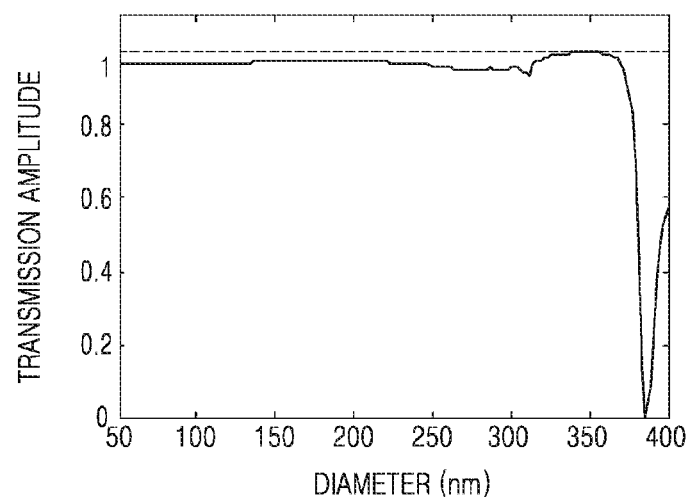
FIG. 5 illustrates a change in the amplitude of a transmission wave depending on the diameter of a nanostructure of a beam scanning device according to an example embodiment.
Figure 6:
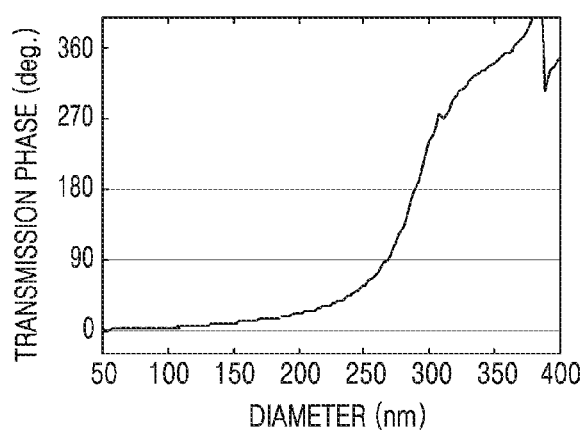
FIG. 6 illustrates a change in the phase of a transmission wave depending on the diameter of a nanostructure of a beam scanning device according to an example embodiment.

FIG. 5 illustrates a change in the amplitude of a transmission wave depending on the diameter of a cylinder when cylindrical nanostructures are arranged as illustrated in FIG. 3. Referring to FIG. 5, the intensity of the transmission wave may have a substantially constant value of 1 until the diameter of the cylinder increases to a particular value. FIG. 6 illustrates a change in the phase of a transmission wave depending on the diameter of a cylinder. Referring to FIG. 6, the transmission phase may change from 0 degrees to 360 degrees. For example, by adjusting the size of the cylinder, the phase may be adjusted while maintaining the strength of the transmission wave. Here, although the cylinder is illustrated as an example, the phase of the transmission wave may be adjusted by arranging the nanostructures by using a combination of the nanostructure shape, the nanostructure arrangement interval, and the nanostructure size.

Figure 7:
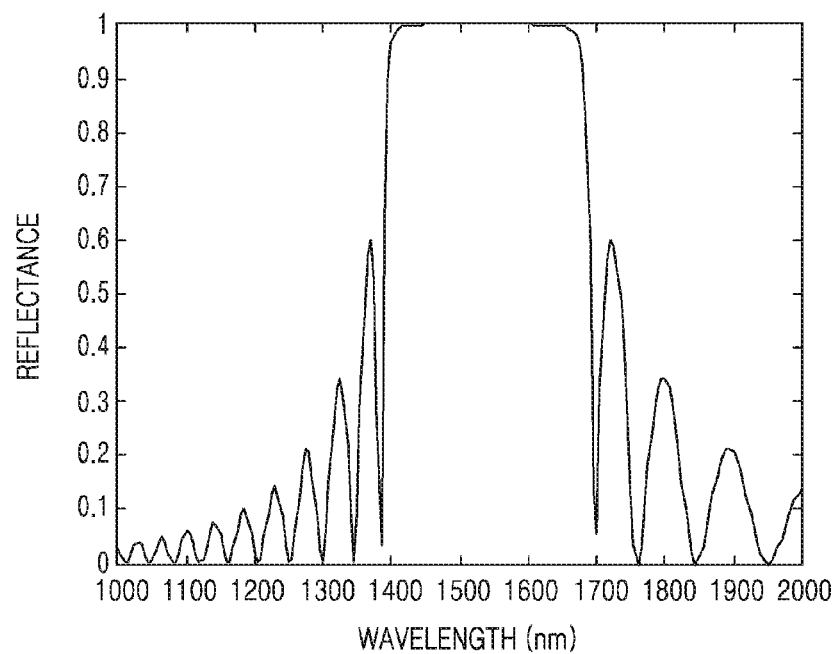
FIG. 7 illustrates a reflection spectrum of a distributed Bragg reflector (DBR) of a beam scanning device according to an example embodiment.

FIG. 7 illustrates a reflection spectrum when a first reflector includes a DBR. Here, the DBR may have a structure in which 20 pairs of $SiN_4$ and $SiO_2$ are stacked to thicknesses of 195 nm and 260 nm, respectively. Referring to FIG. 7, a reflectance of about 1 appears near about 1550 nm.

Figure 8:
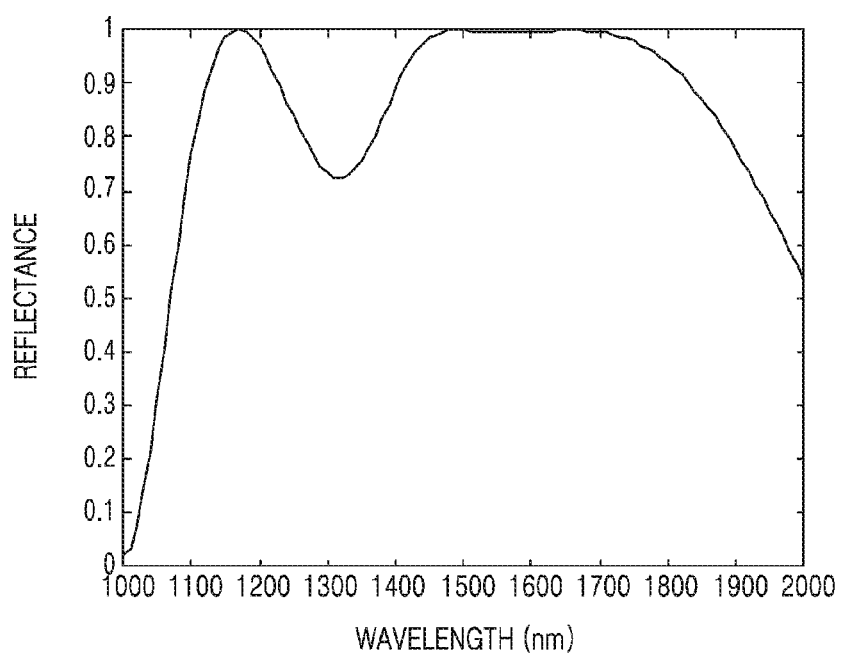
FIG. 8 illustrates a reflection spectrum of a grating reflector of a beam scanning device according to an example embodiment.

FIG. 8 illustrates a reflection spectrum when a second reflector includes a grating reflector. Here, the grating period may be 675 nm, the width may be 430 nm, the height may be 435 nm, and the grating material may be Si. The cavity portion may include $SiO_2$. As for the polarization, the electric field is assumed to have a direction perpendicular to the grating and the incidence angle is assumed to be 0 degrees.

Figure 9:
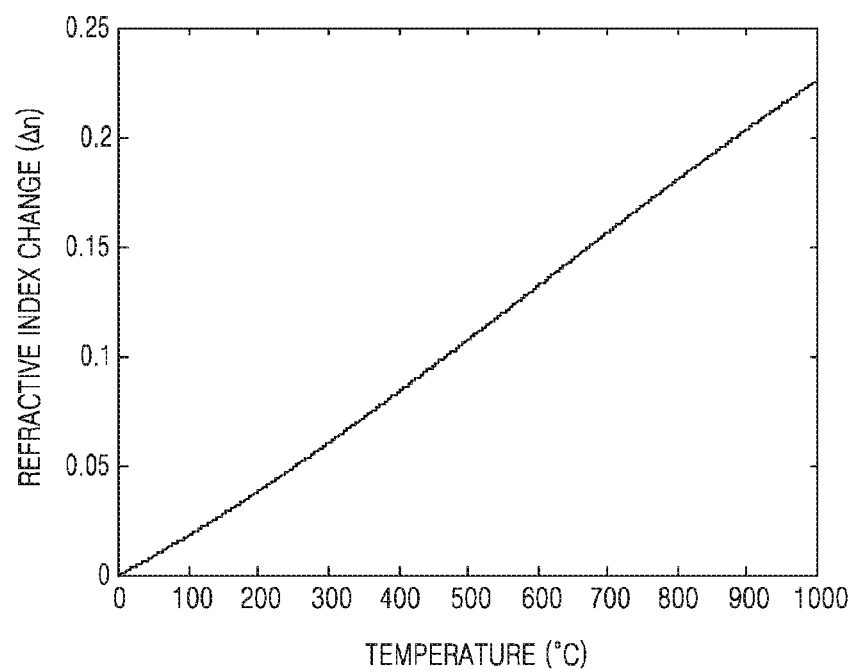
FIG. 9 illustrates a refractive index change of silicon depending on temperature.

The principle of adjusting the reflection phase by an external signal in a unit pixel of the spatial light modulator will be described below. FIG. 9 illustrates a refractive index change of Si depending on temperature. The refractive index of Si may vary according to Equation 1 below.

$$\frac{dn}{dT} = 8.61 \times 10^{-5} + 3.63 \times 10^{-7}T - 2.07 \times 10^{-10}T^2 [K^{-1}] \qquad \langle \text{Equation 1} \rangle$$

Here, T denotes the temperature and n denotes the refractive index. According to Equation 1, when the temperature changes by about 300 degrees, the refractive index of Si changes by about 0.1.

When the refractive index of Si changes, the reflection phase of the grating reflector may change and thus the resonance wavelength may change. As a result, the operation wavelength may deviate from the resonance wavelength. This will be referred to as detuned resonance. The reflection phase may be adjusted by using the detuned resonance.

Figure 10:
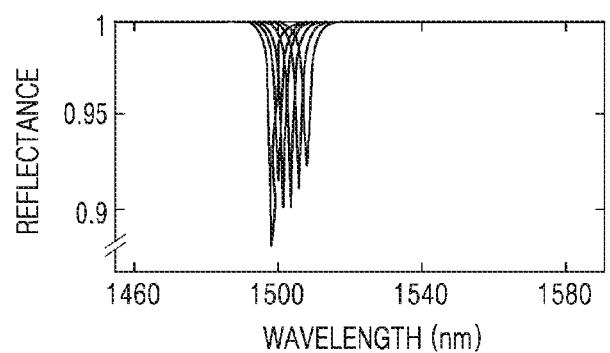
FIG. 10 illustrates a reflectance change depending on the wavelength of a spatial light modulator of a beam scanning device according to the example embodiment.
Figure 11:
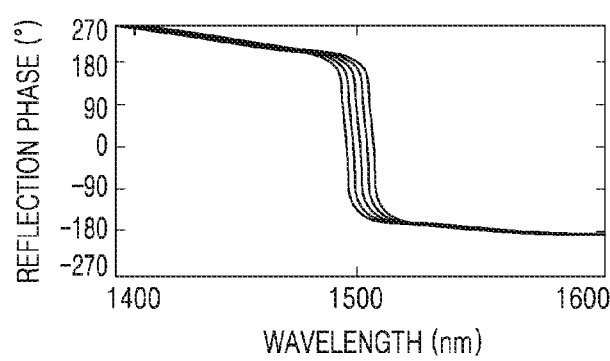
FIG. 11 illustrates a reflection phase change depending on the wavelength of the spatial light modulator of the beam scanning device according to the example embodiment.
Figure 12:
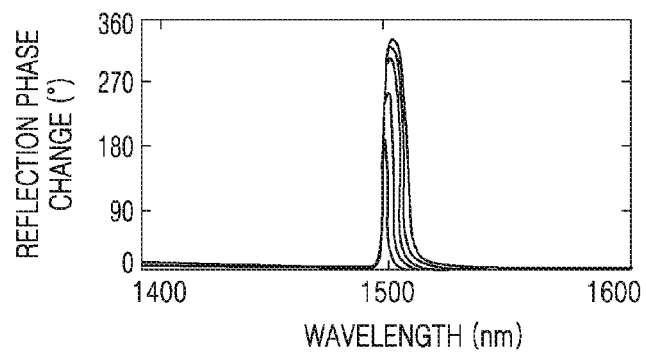
FIG. 12 illustrates a reflection phase variation depending on the wavelength of a spatial light modulator of a beam scanning device according to an example embodiment.
Figure 13:
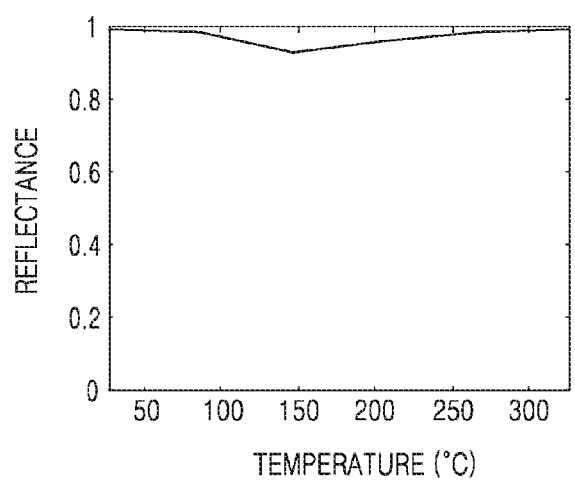
FIG. 13 illustrates a reflectance change depending on a temperature change at a 1502 nm wavelength of a spatial light modulator of a beam scanning device according to an example embodiment.

FIGS. 10 to 12 illustrate the reflection characteristics of a spatial light modulator 130 depending on wavelengths at intervals of 50° C. when the temperature changes from 27° C. to 327° C. FIG. 10 illustrates reflectances depending on wavelengths, and FIG. 11 illustrates reflection phases depending on wavelengths. FIG. 13 illustrates a reflection phase variation depending on wavelengths at 27° C. Here, it illustrates a high reflectance with respect to 1500 nm wavelength light and illustrates a reflection phase change in the range of about 0 degree to 360 degrees.

Figure 14:
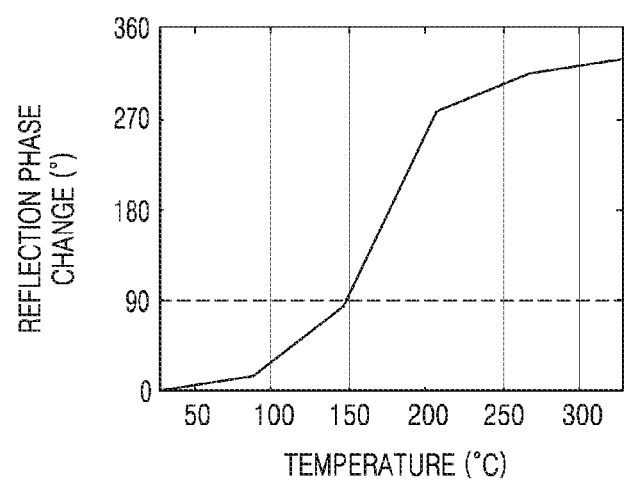
FIG. 14 illustrates a reflection phase variation depending on a temperature change at a 1502 nm wavelength of a spatial light modulator of a beam scanning device according to an example embodiment.

FIGS. 13 and 14 respectively illustrate the reflectance and the reflection phase change depending on the temperature at a 1502 nm wavelength among the reflection characteristics of FIGS. 10 to 12. Here, it is illustrated that the reflection phase changes by about 360° while the reflectance is maintained at a very high value of about 0.9 or more. In other words, a high light efficiency and a wide reflection phase change range may be obtained by the beam scanning device according to various embodiments, and thus a wide viewing angle and field of view (FOV) may be obtained.

Figure 15:
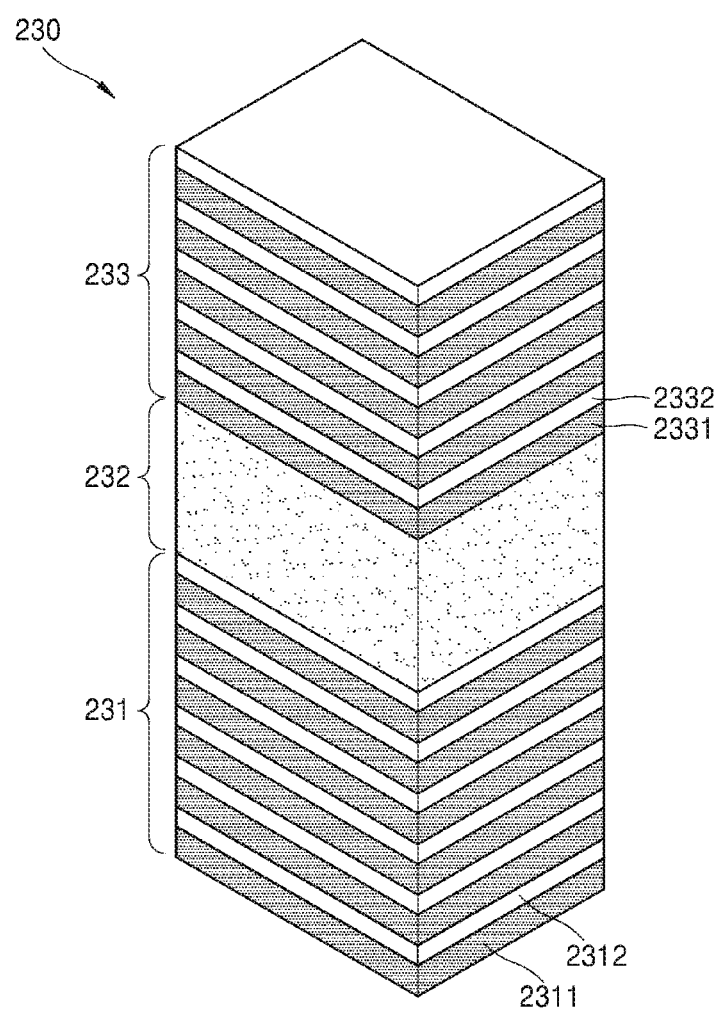
FIG. 15 illustrates another example of a spatial light modulator of a beam scanning device according to an example embodiment.
Figure 16:
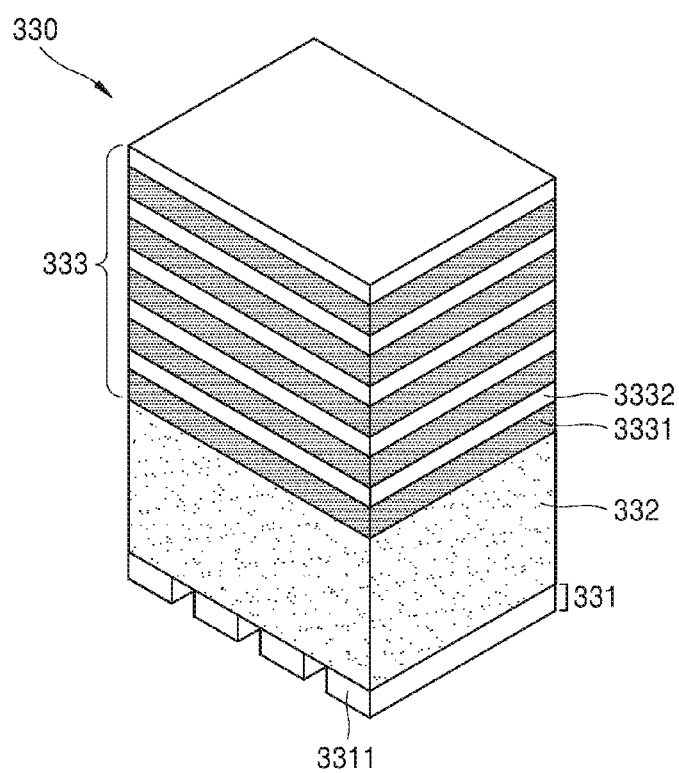
FIG. 16 illustrates another example of a spatial light modulator of a beam scanning device according to an example embodiment.
Figure 17:
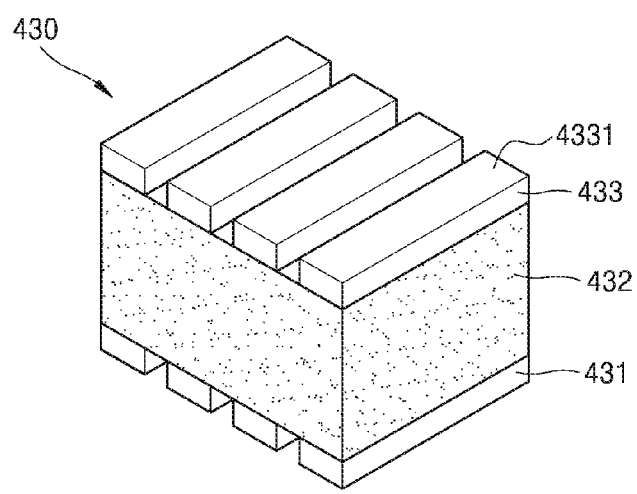
FIG. 17 illustrates another example of a spatial light modulator of a beam scanning device according to an example embodiment.

FIGS. 15 to 17 illustrate various examples of a spatial light modulator.

Referring to FIG. 15, a spatial light modulator 230 may include a first reflector 231, a cavity portion 232, and a second reflector 233. At least one of the first reflector 231 and the second reflector 233 may be embodied as a DBR. The first reflector 231 may have a structure in which a first layer 2311 with a first refractive index n1 and a second layer 2312 with a second refractive index n2 are alternately stacked. For example, the first layer 2311 may have a thickness of λ/4n1 with respect to the first refractive index n1 and the wavelength λ of the light used, and the second layer 2312 may have a thickness of λ/4n2 with respect to the second refractive index n2 and the wavelength λ of the light used. The second reflector 233 may have a structure in which a third layer 2331 with a third refractive index and a fourth layer 2332 with a fourth refractive index are alternately stacked. The first layer 2311 and the third layer 2331 may be formed of the same material, and the second layer 2312 and the fourth layer 2332 may be formed of the same material. However, the present disclosure is not limited thereto. For example, the number of stacked layers of the first reflector 231 may be greater than the number of stacked layers of the second reflector 233. In the present example embodiment, the number of stacked pairs of the first reflector 231 may be adjusted to adjust the light coupling characteristics of the spatial light modulator 230.

Referring to FIG. 16, a spatial light modulator 330 may include a first reflector 331, a cavity portion 332, and a second reflector 333. The first reflector 331 and the second reflector 333 may be embodied as DBRs. The first reflector 331 may include gratings 3311 spaced apart at certain intervals. The DBR may have a structure in which a first layer 3331 and a second layer 3332 having different refractive indexes are alternately stacked.

Referring to FIG. 17, a spatial light modulator 430 may include a first reflector 431, a cavity portion 432, and a second reflector 433. The first reflector 431 and the second reflector 433 may be embodied as grating reflectors. The second reflector 433 may include gratings 4331 spaced apart at certain intervals.

Figure 18:
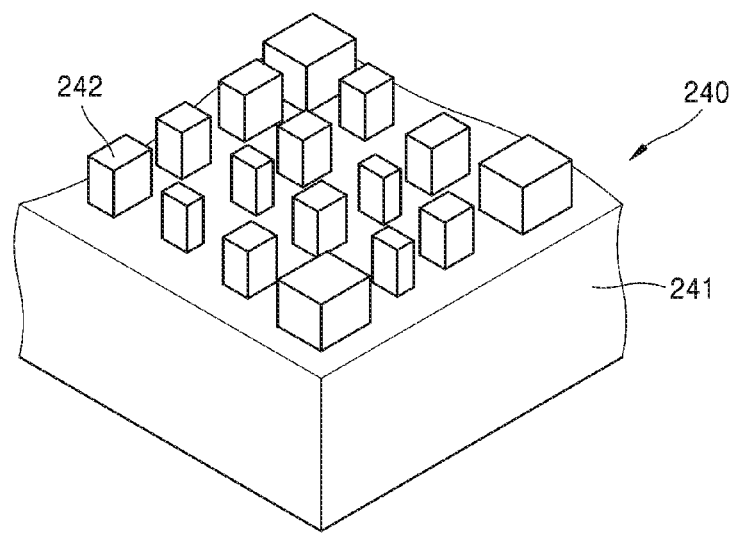
FIG. 18 illustrates another example of a phase mask of a beam scanning device according to an example embodiment.

FIG. 18 illustrates an example of a phase mask 240 corresponding to one pixel. The phase mask 240 may include a plurality of nanostructures 242 arranged on a support plate 241. The support plate 241 may include a transparent plate. The nanostructures 242 may be tetragonal column-shaped, and nanostructures 242 having different sizes or the same size may be arranged. In the present example embodiment, the nanostructures 242 may be periodically arranged and the sizes of the nanostructures may be adjusted. The nanostructure may have a nano-size cross-sectional area. The phase of the light may vary according to the arrangement of nanostructures of different sizes. In this example, the phase is adjusted by differently configuring the sizes of the nanostructures. However, the phase may also be adjusted by differently configuring the shapes of the nanostructures, by differently configuring the arrangement intervals of the nanostructures, or by differently configuring the combinations of the sizes, intervals, and shapes of the nanostructures.

Figure 19:
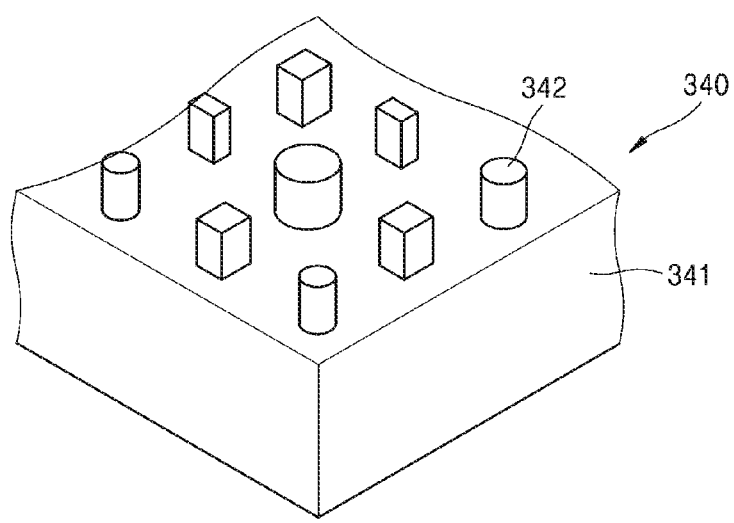
FIG. 19 illustrates another example of a phase mask of a beam scanning device according to an example embodiment.

FIG. 19 illustrates an example of a phase mask having different nanostructure shapes. A phase mask 340 may include a plurality of nanostructures 342 arranged on a support plate 341. For example, in the phase mask 340, cylinders and tetragonal columns may be mixedly arranged, and the sizes of the cylinders and the tetragonal columns may be differently configured. As such, the sizes and shapes of the nanostructures 342 may be differently configured to adjust the phase thereof.

A beam scanning device may be configured by combining the spatial light modulators and the phase masks according to various example embodiments described above. Depending on the combination of the spatial light modulator and the phase mask, the beam scanning device may operate as a reflection type or a transmission type. In a reflective beam scanning device, light may be input to the phase mask, light input to the spatial light modulator through the phase mask may be resonated in the spatial light modulator, and light may be output through the phase mask. In a transmissive beam scanning device, light may be input to the spatial light modulator, resonated in the spatial light modulator, and output through the phase mask.

The operation of a beam scanning device according to an example embodiment will be described below. Here, an example of having a 1D array will be described with reference to FIG. 3. For example, it is assumed that the number of nanostructures 142 in one pixel is N=8, the number of pixels is M=160, the interval between adjacent nanostructures is $\Lambda_D$=500 nm, the pixel size is $\Lambda_S$=4.0 μm, and the wavelength of light used is $\Lambda_0$=1.3 μm. Since the pixel size $\Lambda_S$ of the spatial light modulator 130 is 4.0 mu m, a viewing angle $\theta_{FOV}$ is about ±9.35° when there is no phase mask. The viewing angle may be given by Equation 2 below.

$$\theta_{FOV} = \pm \sin^{-1}\left(\frac{\lambda_0}{2\Lambda}\right) \qquad \langle \text{Equation 2} \rangle$$

In Equation 2, $\theta_{FOV}$ denotes the viewing angle, $\lambda_0$ denotes the wavelength of the light used in a free space, and Λ denotes the pixel size.

Figure 20:
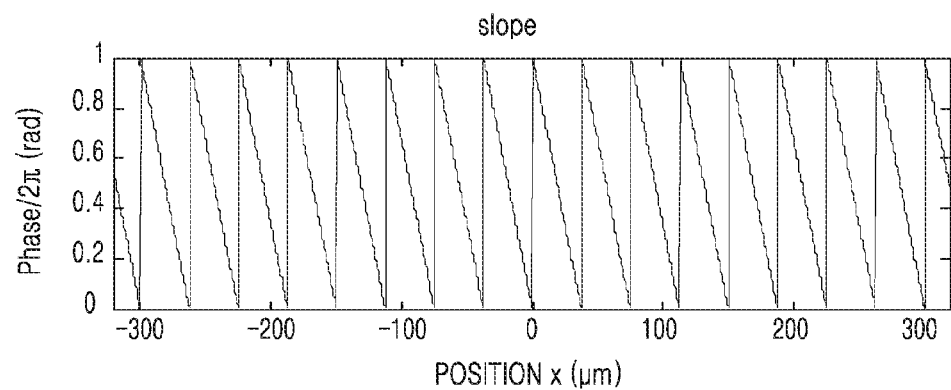
FIG. 20 illustrates a phase distribution for 2-degree beam steering of a beam scanning device according to an example embodiment.
Figure 21:
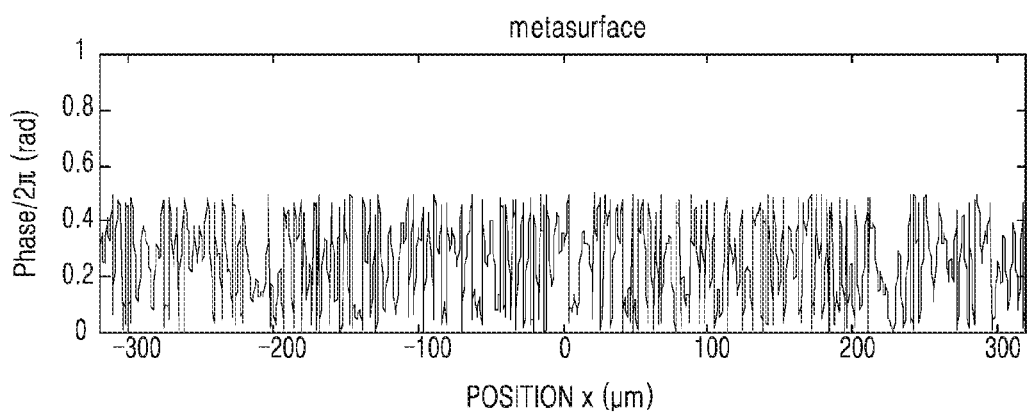
FIG. 21 illustrates a phase distribution for 2-degree beam steering by a phase mask of a beam scanning device according to an example embodiment.

FIG. 20 illustrates, for example, a light wavefront required for 2° beam scanning. For example, a light wavefront for a 2° viewing angle may have a sawtooth-shaped phase distribution. FIG. 21 illustrates the phase by the phase mask. Since an input plane wave is input to the spatial light modulator through the phase mask and is reflected by the spatial light modulator and output through the phase mask, the light passes through the phase mask twice in total. Thus, a designed phase of the phase mask may have a maximum value of π.

Figure 22:
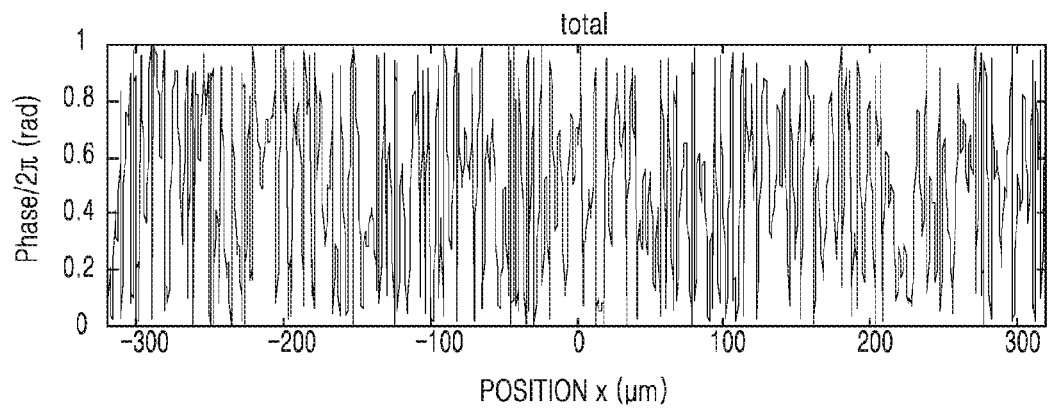
FIG. 22 illustrates a total phase obtained based on FIGS. 20 and 21.
Figure 23:
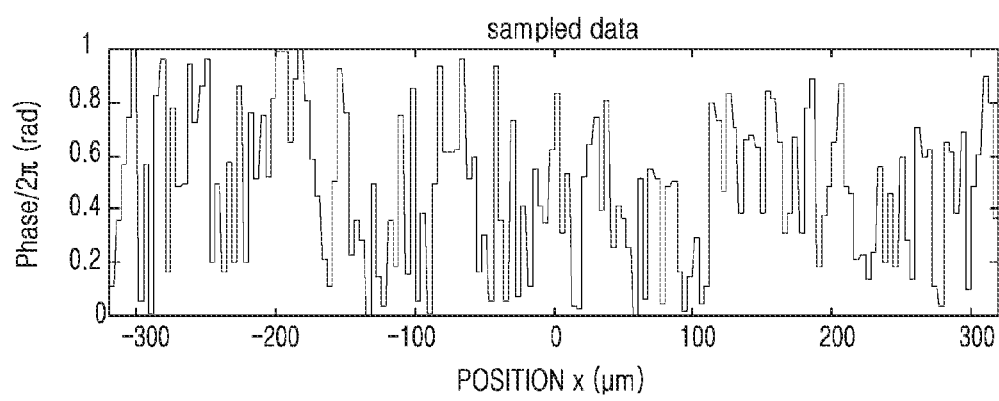
FIG. 23 illustrates a low-pass-filtered sampling phase.

FIG. 22 illustrates a total phase based on FIGS. 20 and 21. The total phase distribution illustrated in FIG. 22 is due to the nanostructure interval $\Lambda_D$=500 nm. Meanwhile, the spatial light modulator 130 may have a larger period than this. For example, the period of the spatial light modulator 130 may be $\Lambda_S$=4.0 μm. Low-pass filtered sampling may be performed in accordance with this period. FIG. 23 illustrates a sampled phase.

Figure 24:
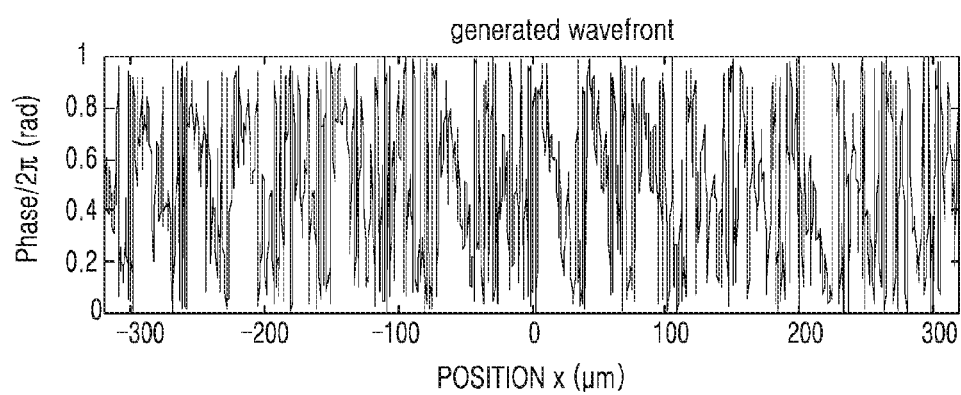
FIG. 24 illustrates a light wavefront generated through a phase mask when a sampled phase of FIG. 23 is implemented by a spatial light modulator.

When the spatial light modulator 130 operates in accordance with the sampled phase of FIG. 23, output light may again pass through the phase mask 140 to generate a light wavefront as illustrated in FIG. 24. It may be seen that the generated light wavefront (FIG. 24) has a roughly similar sawtooth shape in comparison with a desired light wavefront (FIG. 20).

Figure 25:
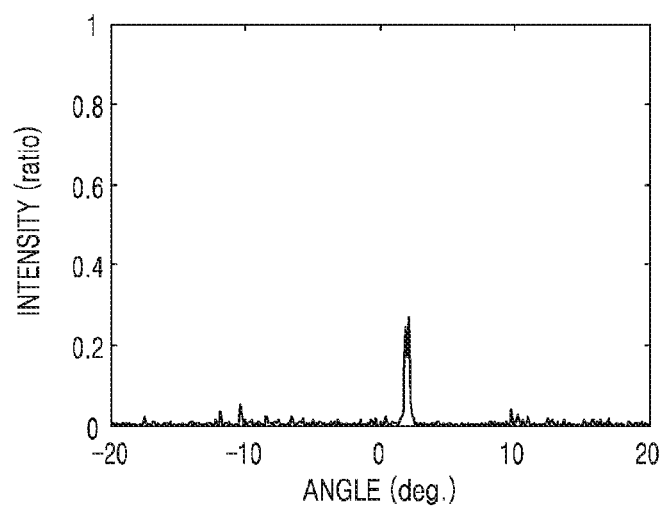
FIG. 25 illustrates the result of 2-degree beam steering of a beam scanning device according to an example embodiment.

Referring to FIG. 25, a beam steering angle is about 2 degrees. Here, the main light efficiency (the power in the main lobe) is about 26%. Also, a ratio of a power of a main light to a power of a side light, which is also referred to as a main/side light ratio or a side mode suppression ratio (SMSR), is about 7.2 dB.

The following describes an example of implementing a beam steering angle of about 15 degrees that is a relatively large angle. As described above, a viewing angle in the range of about ±9.35° may be provided by the spatial light modulator without a phase mask. The generation of a light wavefront for a larger angle of 15° and a beam steering method according thereto will be described below.

Figure 26:
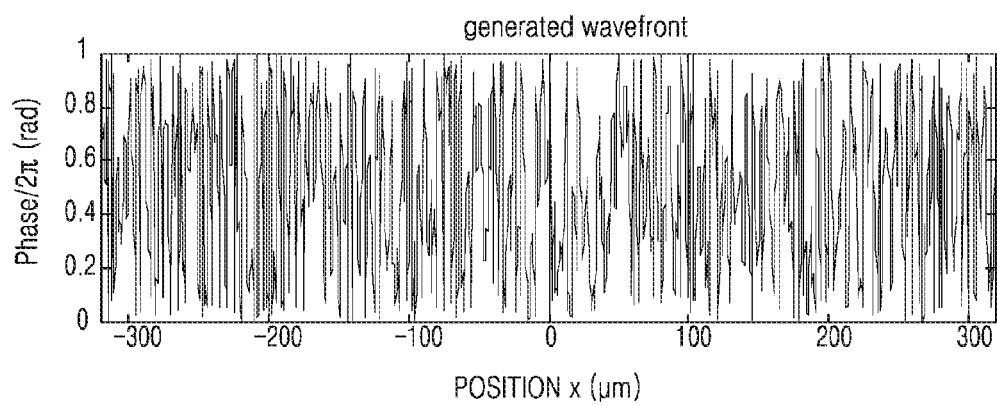
FIG. 26 illustrates a light wavefront generated for 15-degree beam steering of a beam scanning device according to an example embodiment.
Figure 27:
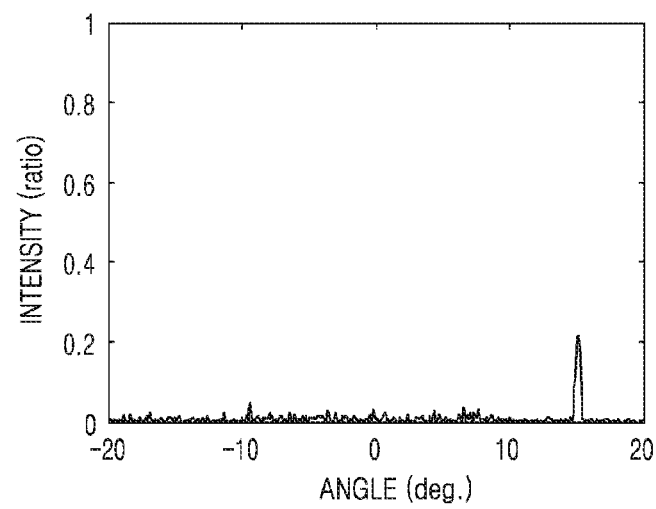
FIG. 27 illustrates the result of 15-degree beam steering of a beam scanning device according to an example embodiment.

FIG. 26 illustrates a light wavefront generated for 15° beam steering. Through the process described above with reference to FIGS. 20 to 23, a 15° beam steering angle may be implemented by a phase mask designed to generate a light wavefront required for 15° beam steering. FIG. 27 illustrates the implementation of a beam steering angle of about 15 degrees. Here, the main light efficiency is 22% and the main/side light ratio is 6.6 dB. A relatively large viewing angle may be provided in comparison with a viewing angle of about ±9.35° in the case of no phase mask. As such, a beam scanning device having an increased viewing angle may be provided by using the spatial light modulator and the phase mask according to various example embodiments. The beam scanning device according to various example embodiments may increase the viewing angle even without significantly reducing the pixel size of the spatial light modulator. Since the pixel size of the spatial light modulator may not need to be significantly reduced, the spatial light modulator may be easily manufactured.

The beam scanning device according to an example embodiment may have a high light efficiency and may steer light by using phase modulation and thus may easily perform horizontal and vertical light scanning.

Figure 28:
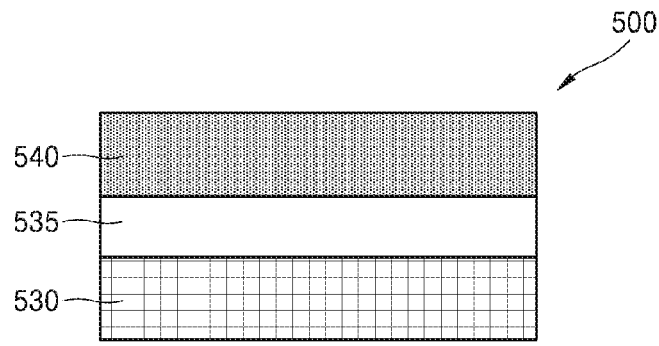
FIG. 28 illustrates a beam scanning device according to another example embodiment.

FIG. 28 schematically illustrates a modularized beam scanning device 500.

The beam scanning device 500 may include a spatial light modulator 530, a phase mask 540, and a spacer 535 between the spatial light modulator 530 and the phase mask 540. The spacer 535 may include a layer for manufacturing the spatial light modulator 530 and the phase mask 540 as one module.

Since the spatial light modulator 530 and the phase mask 540 may be manufactured in a single process, the yield thereof may be increased and the alignment error thereof may be reduced. When the spatial light modulator 530 and the phase mask 540 are manufactured in separate processes, the alignment thereof may be difficult and the beam steering performance thereof may be degraded due to the alignment error thereof.

Figure 29:
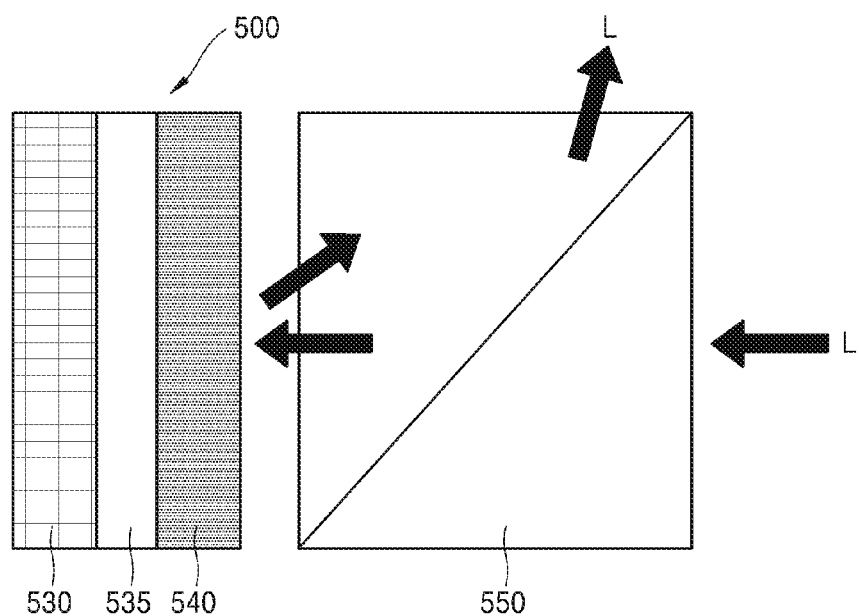
FIG. 29 illustrates an example in which the beam scanning device illustrated in FIG. 28 further includes a light path converter.

FIG. 29 illustrates an example in which the beam scanning device 500 further includes a light path converter 550. The light path converter 550 may include, for example, a beam splitter to split an incident light beam into two or more beams. Examples of the beam splitter may include a plate beam splitter using a dielectric mirror, and a beam splitter cube. The light path converter 550 may be used to utilize the space where the beam scanning device 500 is installed or to change the direction in which a light beam L is output.

The beam scanning devices according to various example embodiments described above may be employed in, for example, a system such as a depth sensor used in a three-dimensional (3D) camera or a 3D sensor such as a vehicle Light Detection and Ranging (LiDAR) sensor, to increase the accuracy of the system.

In addition to vehicle LiDAR, the beam scanning devices according to various example embodiments may be used in a robot LiDAR sensor, a drone LiDAR sensor, security intruder detection systems, subway screen door obstacle detection systems, depth sensors, user face recognition sensors in mobile phones, Augmented Reality (AR), object profiling, and motion recognition in amusement devices or televisions (TVs).

Figure 30:
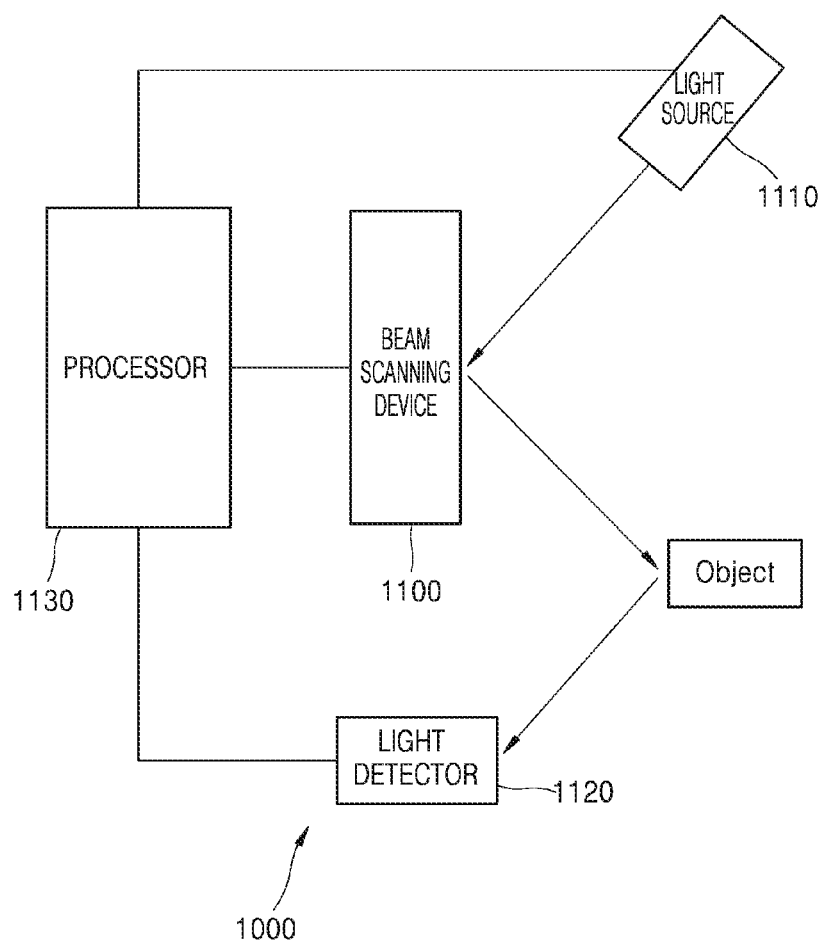
FIG. 30 schematically illustrates a system including a beam scanning device according to an example embodiment.

For example, FIG. 30 is a block diagram schematically illustrating a configuration of a system 1000 according to an example embodiment.

Referring to FIG. 30, the system 1000 according to an example embodiment may include a light source 1110 for radiating light, a beam scanning device 1100 for adjusting the travel direction of the light input from the light source 1110 so that the light that is output from the beam scanning device 100 propagates toward an object, a light detector 1120 for detecting the light when the light output from the beam scanning device 1100 is reflected from the object, and a processor 1130 for controlling the beam scanning device 1100.

The light source 1110 may include, for example, a light source that emits visible light or a laser diode (LD) or a light emitting diode (LED) that emits near infrared rays in the range of about 800 nm to about 1500 nm.

The beam scanning device 1100 may include the example embodiments described with reference to FIGS. 1 to 29. The beam scanning device 1100 may modulate the travel direction of a light beam by modulating the phase by an input of at least one of voltage, current, heat, temperature, and magnetic field for each pixel. The beam scanning device 1100 may perform scanning with a wide viewing angle by using a spatial light modulator and a phase mask. Although FIG. 30 illustrates an example in which the light source 1110 is provided separately from the beam scanning device 1100, the light source 1110 may also be provided in the beam scanning device 1100.

The processor 1130 may control the operations of the beam scanning device 1100, the light source 1110, and the light detector 1120. For example, the processor 1130 may control the on/off operations of the light source 1110 and the light detector 1120 and the beam scanning operation of the beam scanning device 1100. Also, the processor 1130 may calculate information about the object based on the measurement result of the light detector 1120.

In order to obtain information about objects located at positions therearound, the system 1000 may periodically radiate light onto various regions therearound by using the beam scanning device 1100.

Figure 31:
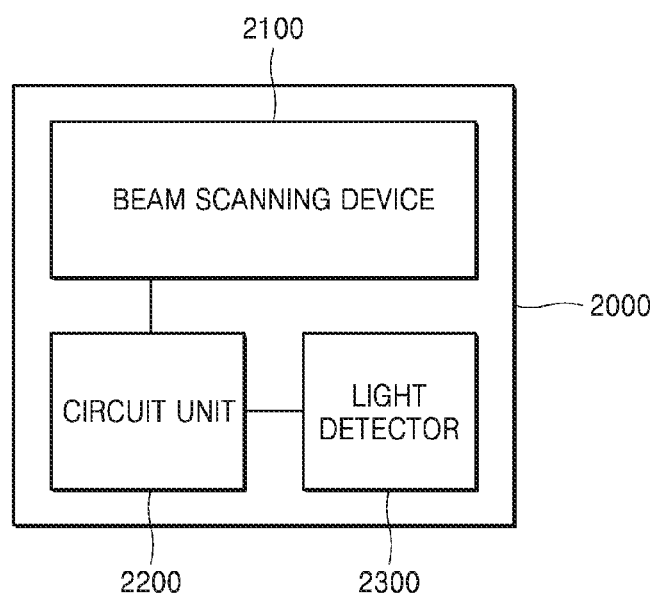
FIG. 31 schematically illustrates a system including a beam scanning device according to another example embodiment.

As illustrated in FIG. 31, a system 2000 may include a beam scanning device 2100 and a light detector 2300 for detecting the light steered by the beam scanning device 2100 and then reflected by an object. The system 2000 may further include a circuit unit 2200 connected to at least one of the beam scanning device 2100 and the light detector 2300. The circuit unit 2200 may include an operator for acquiring and calculating data and may further include a driver, a controller, a processor, and the like. Also, the circuit unit 2200 may further include a power supply unit, a memory, and the like.

Although FIG. 31 illustrates a case in which the system 2000 includes the beam scanning device 2100 and the light detector 2300 in one device, the beam scanning device 2100 and the light detector 2300 may be separately provided in separate devices instead of being provided as one device. Also, the circuit unit 2200 may be connected to the beam scanning device 2100 or the light detector 2300 by wireless communication, not by wire. In addition, the configuration of FIG. 31 may be variously modified.

The beam scanning device according to the above example embodiment may be applied to various systems. For example, the beam scanning device may be applied to a LiDAR device. The LiDAR device may be a phase-shift or time-of-flight (TOF) device. The LiDAR device may be applied to autonomous vehicles, flying objects such as drones, mobile devices, small walking vehicles (e.g., bicycles, motorcycles, strollers, and skateboards), robots, human/animal assistant units (e.g., canes, helmets, ornaments, garments, watches, and bags), Internet of Things (IoT) devices/systems, security devices/systems, and the like.

Figure 32:
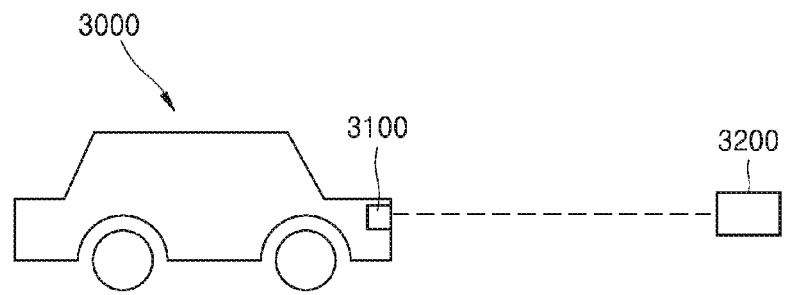
FIG. 32 is a side view illustrating an example in which a beam scanning device according to an example embodiment is applied to a LiDAR sensor.
Figure 33:
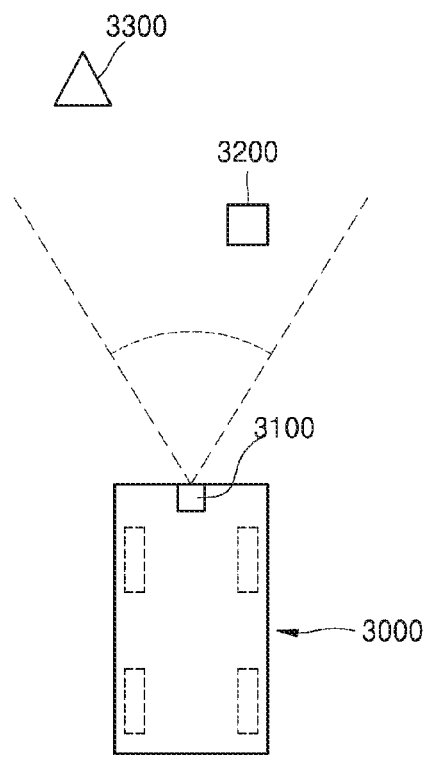
FIG. 33 is a plan view illustrating an example in which a beam scanning device according to an example embodiment is applied to a vehicle LiDAR sensor.

FIGS. 32 and 33 are conceptual diagrams illustrating a case where a LiDAR device including a beam scanning device according to an example embodiment is applied to a vehicle. FIG. 32 is a side view, and FIG. 33 is a top view.

Referring to FIG. 32, a LiDAR device 3100 may be applied to a vehicle 3000, and information about a subject 3200 may be acquired by using the LiDAR device 3100. The vehicle 3000 may be an automobile having an autonomous driving function. An object or a person (i.e., the subject 3200) located in the travel direction of the vehicle 3000 may be detected by using the LiDAR device 3100. Also, the distance to the subject 3200 may be measured by using information such as a time difference between a transmission signal and a detection signal. Also, as illustrated in FIG. 33, information about a near subject 3200 and a distant subject 3300 located within a scan range may be obtained.

The beam scanning device according to various example embodiments of the present disclosure may be applied to various systems in addition to LiDAR sensors. For example, the beam scanning device according to various example embodiments may acquire 3D information of a space and a subject through scanning and thus may be applied to a 3D image acquiring device, a 3D camera, and the like. Also, the beam scanning device may be applied to a holographic display device and a structured light generating device. Also, the beam scanning device may be applied to various optical devices such as hologram generating devices, light coupling devices, varifocal lenses, and depth sensors. Also, the beam scanning device may be applied to various fields in which meta-surfaces or meta-structures are used. In addition, the beam scanning device and the system including the beam scanning device according to the example embodiments of the present disclosure may be applied for various purposes to various fields of optical and electronic devices.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A beam scanning device comprising:
a spatial light modulator configured to modulate a phase of a light for a corresponding pixel of a plurality of pixels; and
a phase mask comprising a support plate arranged in an output direction of the light that is output from the spatial light modulator and a plurality of nanostructures arranged on the support plate differently for each of the plurality of pixels to control the phase of the light.

2. The beam scanning device of claim 1, wherein the spatial light modulator comprises a first reflector, a second reflector, and a cavity provided between the first reflector and the second reflector.

3. The beam scanning device of claim 2, wherein each of the first reflector and the second reflector comprises a distributed Bragg reflector or a grating reflector.

4. The beam scanning device of claim 1, wherein the spatial light modulator is driven independently for each of the plurality of pixels by an input of at least one of voltage, current, heat, and magnetic field.

5. The beam scanning device of claim 1, wherein the support plate comprises a transparent plate.

6. The beam scanning device of claim 1, wherein the plurality of nanostructures comprises a dielectric having a refractive index of about 1.9 to about 4.

7. The beam scanning device of claim 1, wherein the plurality of nanostructures comprises at least one selected from the group consisting of Si, Ge, SiGe, GaAs, $Si_3N_4$, $TiO_2$, GaP, and InSb.

8. The beam scanning device of claim 1, wherein the plurality of nanostructures have a column shape.

9. The beam scanning device of claim 1, wherein the plurality of nanostructures of the phase mask have at least one of a cylinder shape, a polygonal column shape, and a cross column shape.

10. The beam scanning device of claim 1, wherein the plurality of nanostructures are configured differently for each of the plurality of pixels in terms of at least one of a nanostructure size, a number of nanostructures, a nanostructure shape, and an arrangement interval of nanostructures.

11. The beam scanning device of claim 1, wherein an arrangement interval of the plurality of nanostructures is in a range of $\lambda/2n$ to $5\lambda/2n$, where a wavelength of light used in the beam scanning device is $\lambda$ and a refractive index of a nanostructure is n.

12. The beam scanning device of claim 1, wherein a height of the plurality of nanostructures is in a range of $3\lambda/2n$ to $7\lambda/2n$, where a wavelength of the light incident onto the beam scanning device is $\lambda$ and a refractive index of the plurality of nanostructures is n.

13. The beam scanning device of claim 1, further comprising a spacer provided between the spatial light modulator and the phase mask.

14. A system comprising:
a light source configured to radiate a light;
a beam scanning device configured to scan an object by adjusting a travel direction of the light that is output from the light source, the beam scanning device comprising:
a spatial light modulator configured to modulate a phase of the light for a corresponding pixel of a plurality of pixels, and
a phase mask comprising a support plate arranged in an output direction of the light that is output from the spatial light modulator and a plurality of nanostructures arranged on the support plate differently for each of the plurality of pixels to control the phase of the light; and a light detector configured to detect the light that is reflected from the object.

15. The system of claim 14, wherein the spatial light modulator comprises a first reflector, a second reflector, and a cavity portion provided between the first reflector and the second reflector.

16. The system of claim 15, wherein each of the first reflector and the second reflector comprises a distributed Bragg reflector or a grating reflector.

17. The system of claim 14, wherein the spatial light modulator is driven independently for each of the plurality of pixels by an input of at least one of voltage, current, heat, and magnetic field.

18. The system of claim 14, wherein the plurality of nanostructures comprise a dielectric having a refractive index of about 1.9 to about 4.

19. The system of claim 14, wherein the plurality of nanostructures include at least one selected from the group consisting of Si, Ge, SiGe, GaAs, $Si_3N_4$, $TiO_2$, GaP, and InSb.

20. The system of claim 14, wherein the plurality of nanostructures of the phase mask include at least one of a cylinder, a polygonal column, and a cross column.

21. The system of claim 14, wherein the plurality of nanostructures are configured differently for each pixel in terms of at least one of a nanostructure size, a number of nanostructures, a nanostructure shape, and an arrangement interval of nanostructures.

22. The system of claim 14, wherein an arrangement interval of the plurality of nanostructures is in a range of $\lambda/2n$ to $5\lambda/2n$, where a wavelength of the light is $\lambda$ and a refractive index of a nanostructure is n.

23. The system of claim 14, wherein a height of the plurality of nanostructures is in a range of $3\lambda/2n$ to $7\lambda/2n$, where a wavelength of the light is $\lambda$ and a refractive index of a nanostructure is n.

24. The system of claim 14, wherein the beam scanning device further comprises a spacer between the spatial light modulator and the phase mask.

25. A beam scanning device comprising:
a plurality of pixels,
wherein each of the plurality of pixels comprises:
  a spatial light modulator configured to modulate a phase of a light based on a voltage applied to the spatial light modulator; and
  a phase mask comprising a plurality of differently-shaped nanostructures configured to deflect the light incident onto the plurality of nanostructures from the spatial light modulator, and
wherein the plurality of pixels have different nanostructure arrays from each other.

* * * * *